(12) United States Patent
Connor et al.

(10) Patent No.: US 7,573,940 B2
(45) Date of Patent: Aug. 11, 2009

(54) DATA TRANSMISSION AT ENERGY EFFICIENT RATES

(75) Inventors: Patrick Connor, Portland, OR (US); Yadong Li, Hillsboro, OR (US); William Campbell, Beaverton, OR (US); Indumathi Madhavan, Hillsboro, OR (US); Miles Penner, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 661 days.

(21) Appl. No.: 11/296,958

(22) Filed: Dec. 7, 2005

(65) Prior Publication Data
US 2007/0127581 A1 Jun. 7, 2007

(51) Int. Cl.
*H04L 25/00* (2006.01)
(52) U.S. Cl. .................................................. 375/257
(58) Field of Classification Search .................. 375/257
See application file for complete search history.

(56) References Cited

U.S. PATENT DOCUMENTS

| 6,377,512 | B1* | 4/2002 | Hamamoto et al. | 365/233.17 |
| 7,426,597 | B1* | 9/2008 | Tsu et al. | 710/307 |
| 2005/0097378 | A1* | 5/2005 | Hwang | 713/320 |
| 2005/0268137 | A1* | 12/2005 | Pettey | 713/400 |

* cited by examiner

*Primary Examiner*—David C Payne
*Assistant Examiner*—Nader Bolourchi
(74) *Attorney, Agent, or Firm*—Blakely, Sokoloff, Taylor & Zafman LLP (57) ABSTRACT

A method and apparatus for data transmission at energy efficient rates. An embodiment of an apparatus includes a port for the transfer of data. The port has an active state in which the port may transmit or receive data and an inactive state in which the port does not transmit or receive data. The apparatus further includes logic to control the transfer of data. The logic places the port into the active state for a first time period for the transfer of data and places the port into the inactive state for a second time period. The logic further prevents transfer of data during the inactive state.

20 Claims, 6 Drawing Sheets

Fig. 1

| Link Speed (Mbps) | Power | Energy |
|---|---|---|
| 1000 (active) | 1500 | 1.5 |
| 1000 (idle) | 1300 | -- |
| 100 (active) | 500 | 5 |
| 100 (idle) | 400 | -- |
| 10 (active) | 250 | 25 |
| 10 (idle) | 200 | -- |

| Link Speed | Data Transfer Time (ms) | Transfer Energy | Pause Transfer Time (ms) | Power Transfer Time (ms) |
|---|---|---|---|---|
| 1Gbps | 8.75 | 13 | 0 | 0 |
| 100Mbps | 87.5 | 44 | 0 | 0 |
| 10Mbps | 875 | 131 | 0 | 0 |
| 1Gbps w/ Sleep | 8.75 | 13 | 0.05 | 20 |

DATA TRANSMISSION AT ENERGY EFFICIENT RATES

FIELD

An embodiment of the invention relates to data communication in general, and more specifically to data communication at energy efficient rates.

BACKGROUND

In computer data communications, there is often a trade-off between desired outcomes. In one example, the performance of a system is often balanced against power consumption. In common computer systems, more overall power is consumed when the speed of operation is increased. For this reason, increasing performance in the speed of transmission of data will generally have costs in the consumption of power and, as a result, in the generation of excess heat. The power utilization of components has become increasingly important to manufacturers as computers and other electronic devices become smaller and more powerful, thus implicating issues of energy costs, battery size and life, and thermal considerations to dissipate heat.

In order to minimize power consumption and heat generation, the operation of a conventional computer component or other device will often be reduced to a minimally acceptable speed. This sacrifice of performance is particularly important in mobile operations in which the power source is a battery or other portable power generation or storage device. If power usage is reduced, then greater length of operation may be possible, a smaller and lighter battery may be useable, and additional heat dissipation measures may be avoided.

However, the increasing speed of communications and computer operations and the increasing data loads faced by systems make the tradeoff between power consumption and speed of data transmission more difficult, and thus sacrificing the performance of a system may be not acceptable. If other possible power savings measures are in place, then a reduction in speed in data transmissions may further reduce power consumption and heat generation, but only at the cost of insufficient system performance.

BRIEF DESCRIPTION OF THE DRAWINGS

Embodiments of the invention may be best understood by referring to the following description and accompanying drawings that are used to illustrate embodiments of the invention. In the drawings.

DETAILED DESCRIPTION

A method and apparatus are described for communication at energy efficient rates.

In one embodiment of the invention, a component transfers data at a particular data rate and then transitions to a low power inactive state when not transmitting data. In an embodiment of the invention, the component reduces energy consumption by sleeping and preventing any data transmission during inactive periods.

In an embodiment of the invention, a component may choose a data rate based on efficiency in terms of energy consumed per unit of data transferred. In one embodiment, a component chooses the most energy efficient link speed for a data transmission.

In an embodiment of the invention, a component may notify an operating system (OS) regarding an effective rate of data transmission. In an embodiment, the effective rate of data transmission is based at least in part on the current link speed and the ratio between active time periods and inactive time periods for data transmission.

For the transfer of data, the consumption of power in terms of Watts (or Joules of energy per second) may be less important than the consumption of energy in terms of energy per unit of data, such as in terms of Joules of energy expended per bit of data transferred. This is true because energy usage of a device is not generally linear with respect to link speed. While energy usage generally increases with link speed, the energy usage does not necessarily increase at the same rate as the link speed. For this reason, there may be a link speed for a device that is more efficient than other link speeds in that the device consumes the least amount of energy per bit of data using the chosen link speed. Under an embodiment of the invention, a device may determine and utilize the most efficient available link speed for a transmission.

For the purposes of an embodiment of the invention, energy efficiency determination may take into account various factors. For example, the energy efficiency determination may include energy consumed by an element when the device is actively transmitting data, when the element is in a low power inactive state between data transmissions, and when the element is transitioning between active and inactive states. In an embodiment, the energy efficiency may be based on the total energy cost of a device during a time period.

Under an embodiment of the invention, a component may include, but is not limited to, an I/O (input/output) controller or similar I/O component or element of a computing system. The transmission of data may utilize, but is not limited to, Ethernet technology, and may include MAC (media access controller), PHY (physical line or media interface), or combined MAC/PHY Ethernet elements. The component may include logic to control data transmission processes and may include one or more ports for the transmission of data. Under an embodiment of the invention, a component may support multiple different data transmission rates, with the rates varying in efficiency in terms of energy consumed per unit of data transferred. In one example, a device may include a 10/100/1000BASE-T Gigabit Ethernet device that includes ports that support speeds of 10 Mbps (megabits per second), 100 Mbps, and 1000 Mbps. In an embodiment in which a component has multiple link speeds, the component logic may select the most energy efficient link speed that is available. While this description generally refers to a component, the component may be any element, apparatus, system, platform, or combination of elements.

In most cases the most efficient data transmission rate for a component will be the fastest link speed that is supported by both the transmitting device and the receiving device under the circumstances. In this way, a choice of the most efficient available link speed may also maximize the speed of transmission for the current conditions. However, embodiments of the invention are not limited to use of the fastest available link speed, and will relate to the choice of any energy efficient link rate regardless of the applicable link rate.

Under an embodiment of the invention, a determination regarding a link speed may be made based at least in part on the amount of energy expended for the transmission of a given amount of data (as expressed in, for example, Joules of energy per bit of data). In an embodiment, the component will transmit data at the selected rate and then transition to a low power inactive state, such as a deep sleep state, until more data is to be transmitted.

In one embodiment of the invention, a component will prevent a link partner from engaging in any I/O activity during an inactive time period, which allows the component to sleep. There are multiple methods by which the link partner may be instructed to refrain from activity in different embodiments of the invention. In one possible embodiment, pause frames may be used, such as IEEE 802.3x pause (XOFF) frames (IEEE, Specification for 802.3 Full Duplex Operation and Physical Layer Specification for 100 Mb/s Operation on Two Pairs of Category 3 or Better Balanced Twisted Pair Cable (10BASE-T2), 1997; and later 802.3 specifications, including 1998 and 2000). While the link partner is paused, the component can go into a low power inactive mode.

In one embodiment of the invention, a component will batch data packets together to transmit during active periods. For example, data packets transmit requests occurring during an inactive period may be queued and be held until the component transitions to the active mode, at which time all the queued packets may be sent.

In one embodiment of the invention, a component transitions to a low power state during inactive periods. If the inactive state for a higher speed has sufficiently low power consumption requirements, then the overall power consumption over a cycle of active mode data transfers and inactive mode sleep will be less than the power consumption that would result from running the component at a slower link speed. In one embodiment, the low power inactive state is a deep sleep state in which there are no I/O activities. In one embodiment, the low power state is a state that reduces the power consumed to a lower level, but that maintains a link between the transmitting component and the receiving component. However, embodiments of the invention are not limited to any particular low power implementation and may operate with any state that consumes less power than the active state of the transmitting component. Various different types of low power or sleep states or modes may be available for various components and system technologies.

In one embodiment of the invention, a component reports a link speed to an operating system, with the reported link speed reflecting an effective rate of data transmission rather than the actual link speed. In an embodiment, the effective rate of transmission takes into account the current duty cycle of the component, the duty cycle reflecting the percentage or proportion of time that the component is active versus inactive. In an embodiment, an effective rate of data transmission may be calculated as the link speed times the proportion of time in which the component is active. For example, if the link speed is 1 Gb per second while the current duty cycle is 5 percent (the component is active 5 percent of the time and in a low power inactive state 95 percent of the time), then the effective rate of transmission is 0.05×1000 Mb per second =50 Mb per second. In this example, the component reports a link speed of 50 Mbps to the operating system. The operating system then can use the reported link speed for data expectations and avoid confusion regarding the actual throughput at a given link speed.

In an embodiment of the invention, the transmission duty cycle for a component may be adjusted as needed. For example, if too much data is buffered before transmission to allow all of the data to be transferred during the active portion of the duty cycle, then the active portion of the duty cycle may be increased to allow batched packets to be transmitted during the active portion of a duty cycle. Similarly, if the amount of data presented for transmission is small, then the active portion of the duty cycle may be reduced to further reduce the length of time that the component is active and thus further reduce the total power consumption of the device.

In an embodiment of the invention, data transmission may include the following processes:

(a) Receiving data for transmission between a component and a link partner. The received data packets may be held during an inactive time for sending in a batch process in an active period.

(b) If multiple link speeds are available, selecting the most energy efficient link speed that is available for the transmission between the component and the link partner. If the link speeds become more efficient as they increase, then the most energy efficient link speed would be the fastest link speed supported by both the component and its link partner.

(c) Reporting a link speed to the operating system that is consistent with what the expected data throughput will be for the current duty cycle.

(d) Transferring data at the chosen link speed.

(e) When the active period for the component has ended, preventing the link partner from sending additional data packets to allow the component to remain dormant for a certain amount of time.

(f) Transitioning the component to a low power inactive (or sleep) mode with no I/O transfers occurring during this period.

(g) Returning to an active mode of operation for additional data operations.

(h) Adjusting the duty cycle as needed depending on the current conditions.

Figure 1:
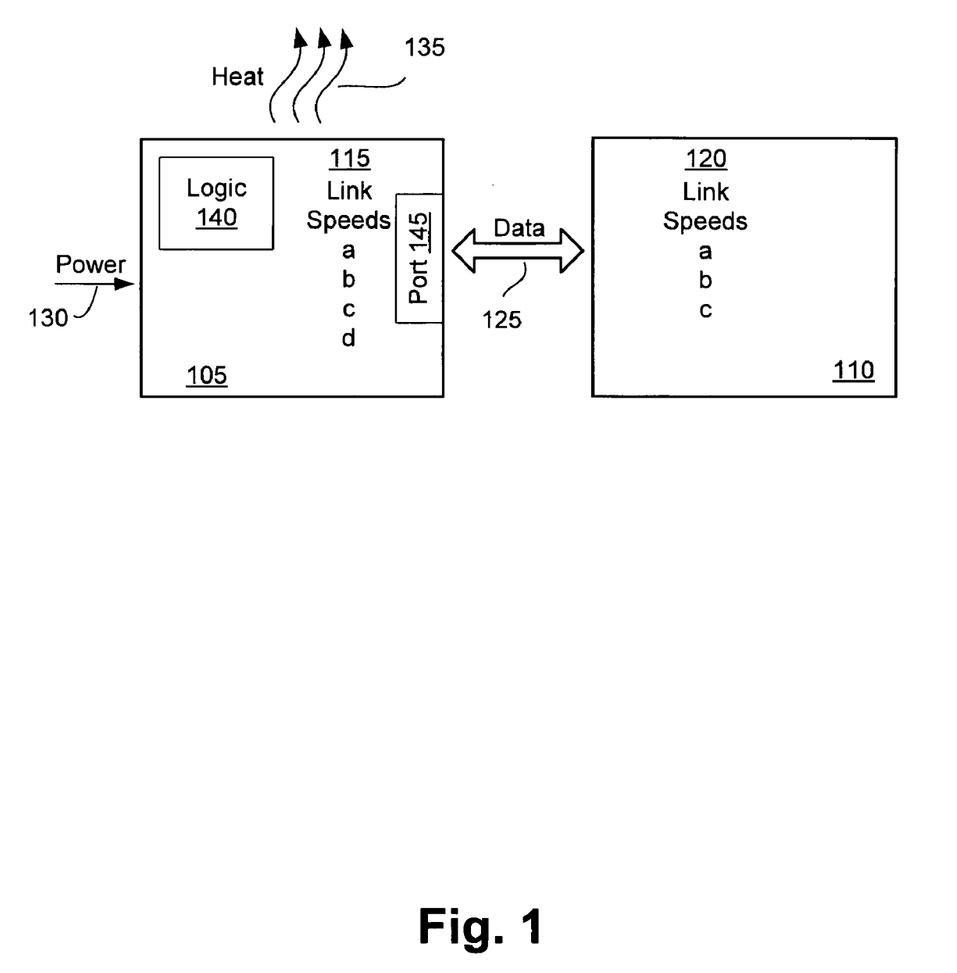
FIG. 1 is an illustration of an embodiment of data communications between elements.

FIG. 1 is an illustration of an embodiment of data transmission between elements. In this illustration, a first component 105 is transmitting data to or receiving data from a second component 110. The first component 105 and the second component are elements of some system or apparatus, such as a computer. The first component 105 may include logic 140 to control data transmission and may include one or more ports 145 for the transmission of data. The first component 105 may be capable of transferring data at various different link speeds 115, represented by speed a, b, c, and d, and the second component 110 may be capable of receiving data at various different link speeds, represented by speeds a, b, and c. The link speeds supported by each component are not necessarily the same. In this illustration, the first component 105 will transmit data 125 to the second component at a link speed that is supported by both components.

In an embodiment of the invention, the first component 105 transfers data to the second component 110 during an active state, and then transitions to an inactive state during which no data is transferred between the components. To reduce the power consumption 130, the inactive state is a low power state, such as a sleep state, that may be utilized when not transmitting data. In an embodiment of the invention in which there are multiple possible link speeds, the first component may transfer data 125 at the available link speed 115 that most efficiently transfers the data in terms of energy per unit of data. In this manner, the first component reduces the power consumption 130 of the system and potentially reduces the excess heat production 135 of the system.

Figure 2A:
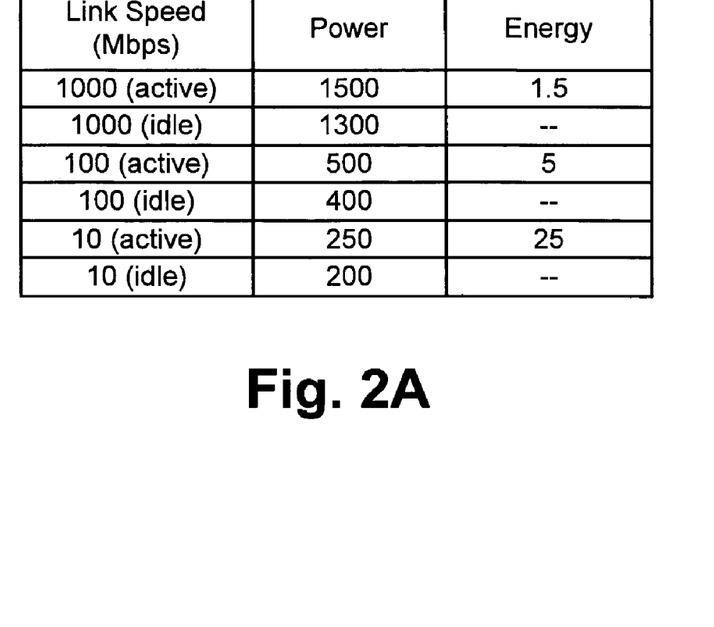
FIG. 2A is a table to illustrate power consumption of an exemplary device at varying link speeds.

FIG. 2A is a table to illustrate power consumption of an exemplary device at varying link speeds. While this table shows the results for a particular device with certain characteristics, embodiments of this invention are not limited to these characteristics and can be applied to any device that has varying energy requirements for different speed or clock settings. In this illustration, it can be seen that the power consumed by the device increases with the link speed setting. For active operation, the power consumed rises from 250 power units at 10 Mb per second to 1500 units at 1000 megabits per second. There is a reduction of power consumed when the device is at idle, but, for this particular device, the reduction is not significant, such as a reduction from 1500 units to 1300 units when the device is active versus idle at a link speed of 1 gigabit per second. For this reason, a conventional system may reduce the link speed to save power and further to reduce excess heat production. For instance, the active power consumption at 100 Mb per second is still less than the idle power consumption at 1000 Mb per second and thus a convention system may run at 100 Mb per second to conserve power.

However, it can also be seen that, while the total power consumption is greater as the link speed increase, the energy that is consumed in active operation when measured as energy per unit of data transferred, such as in terms of Joules per bit, actually decreases as the link speed increases. The reason for this is that the increase is power as link speed increases is not linear for this device. Under an embodiment of the invention in which there are multiple available link speeds, a system may select the most efficient available link speed for a device in terms of energy per unit of data transferred and transfers data using this link speed.

Figure 2B:
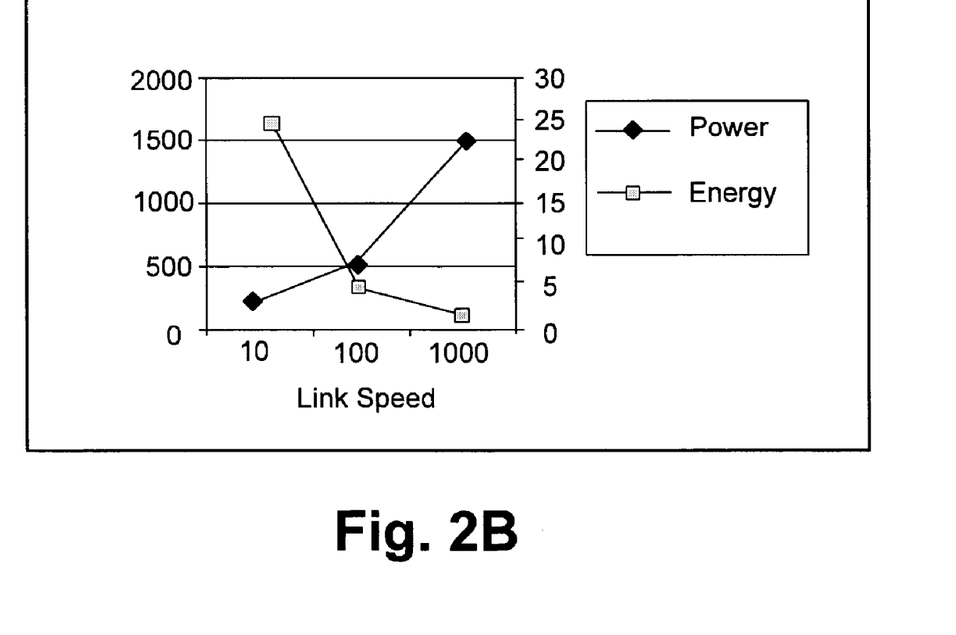
FIG. 2B is a graph to illustrate power consumption of an exemplary device at varying link speeds.

FIG. 2B is a graph to illustrate power consumption of an exemplary device at varying link speeds. The illustrated graph provides a diagram of the characteristics of the device that provides the results shown in FIG. 2A. As shown in this logarithmic scaled graph, the power consumed at the differing link speeds is increasing as link speeds increase. While the total power consumed is increasing, conversely the energy consumed in terms of energy per bit is actually decreasing. Under an embodiment of the invention, a system utilizes the characteristics of a specific device to transmit at the most energy efficient rate that is available for the device under the circumstances.

Figure 3:
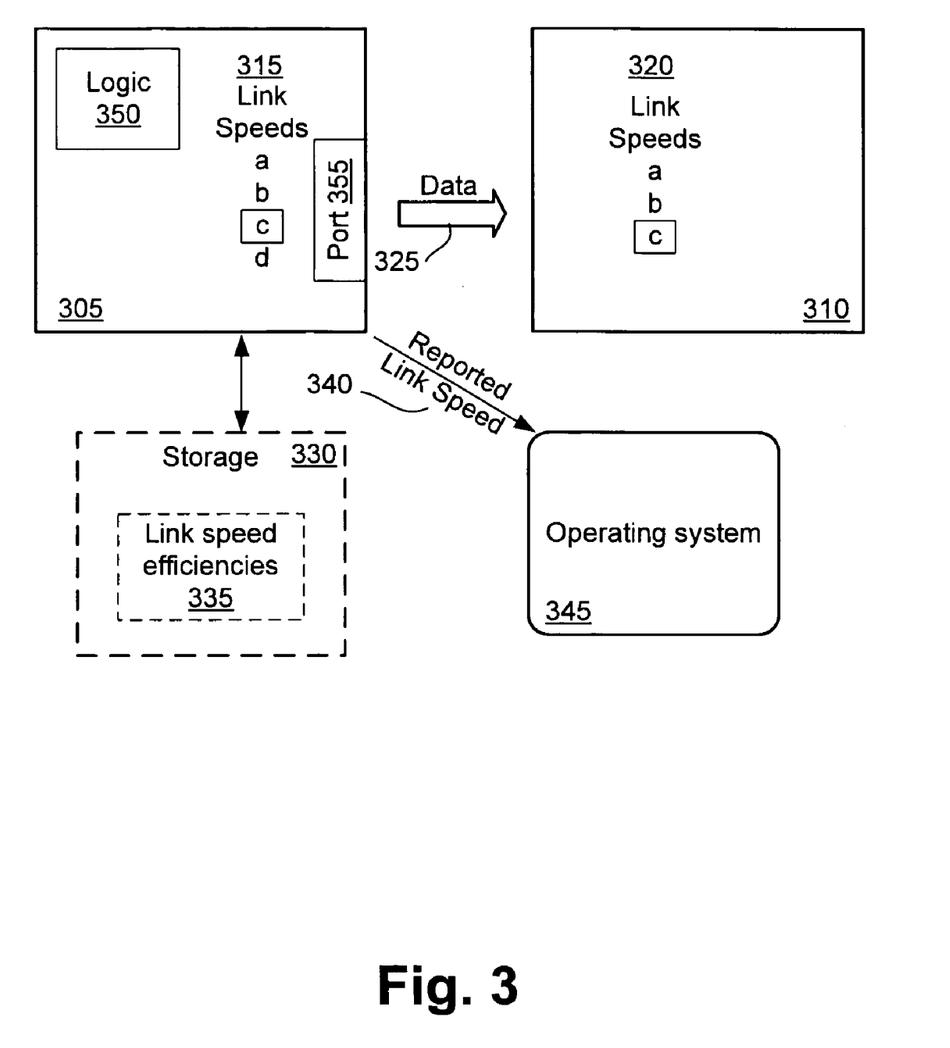
FIG. 3 is an illustration of a system to transfer data at an energy efficient link rate under an embodiment of the invention.

FIG. 3 is an illustration of a system to transfer data at an energy efficient link rate under an embodiment of the invention. In this illustration, a first element 305 is communicating with a second element 310. The first element 305 may include logic 350 to control data transfer processes by the element and may include one or more ports 355 for the transmission of data. In one embodiment of the invention, the system transfers data efficiently by transferring data during an active period and sleeping during a low power inactive period. In an embodiment of the invention, the first element prevents any data transference during the inactive period.

In one embodiment of the invention, the system may include multiple link speeds. The system may select a link speed from the multiple link speeds. The selection of the link speeds may vary with the particular embodiment. In one embodiment, the data efficiency of the link speeds may be a part of the logic 350 of the first element. In another embodiment, information regarding energy efficiency may be contained in another location, such as, for example, data regarding the efficiency of link speeds 335 contained in a memory, register, or other data storage 330. In an embodiment, the system selects a link speed based the energy efficiency of each available link speed. For example, the first element 305 and the second element 310 may communicate at a link speed 315 and 320 that is the most energy efficient link speed available for such elements, shown as link speed c in this example.

In an embodiment of the invention, a link speed is reported 340 to the operating system 345. The reported link speed 340 is generally not the actual link speed, but rather reflects an effective link speed based on the speed of transmission and the current duty cycle of the data transmission, the duty cycle representing the relative time periods for active and inactive modes. The reported link speed 340 reflects the expected data throughput for the system, and thus will reflect the data rate that the operating system 345 will be expected to see.

Figure 4:
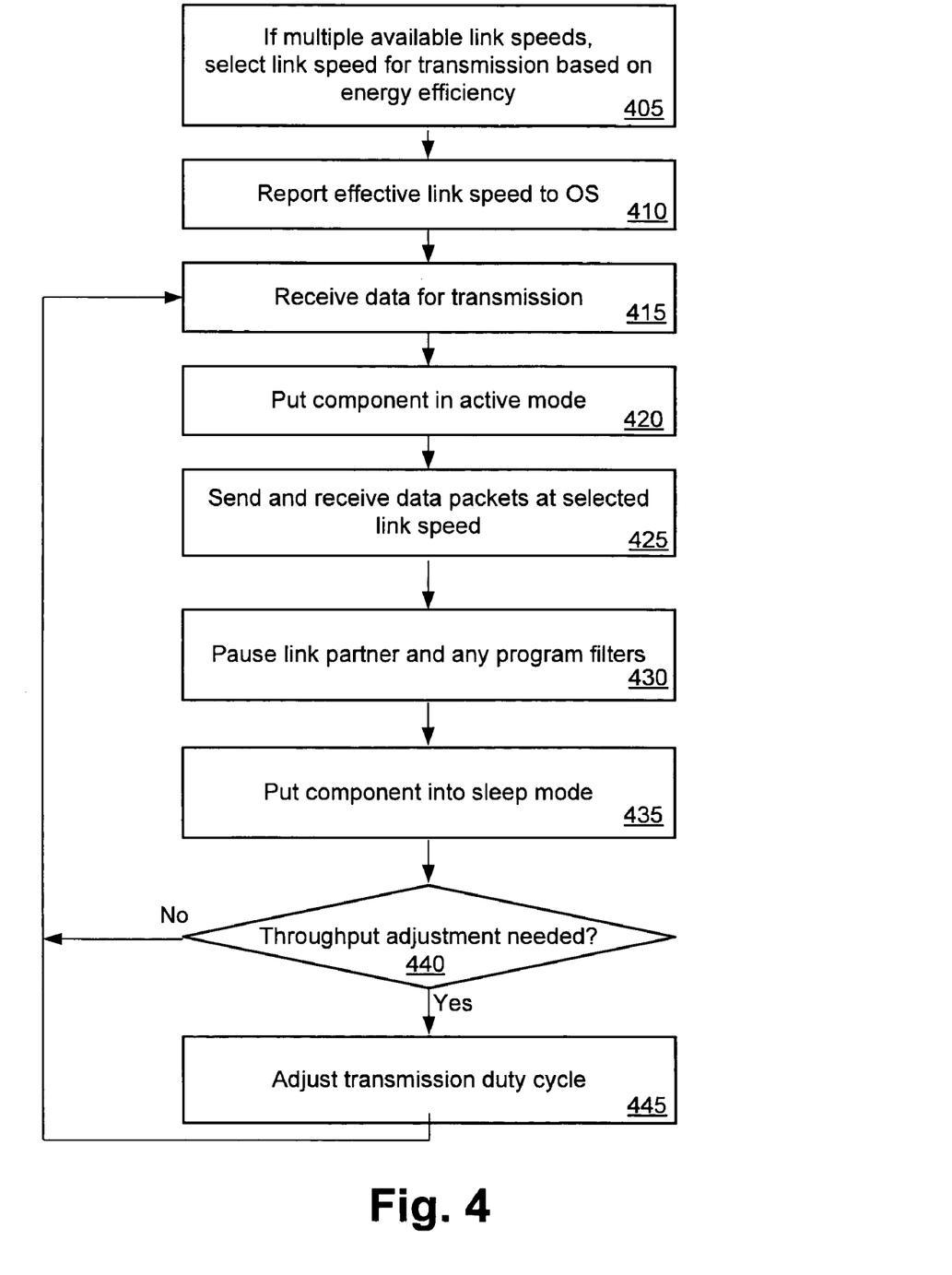
FIG. 4 is a flowchart to illustrate a method for transmitting data at an energy efficient rate under an embodiment of the invention.

FIG. 4 is a flowchart to illustrate a method for transmitting data at an energy efficient rate under an embodiment of the invention. In an embodiment of the invention, data is transferred between a component and a link partner. The component may comprise, for example, an I/O controller transmitting and receiving data via Ethernet technology. In one embodiment, the component may have multiple available link speeds and a link speed may be selected based on the relative energy efficiency of the link speeds 405, with the efficiency of each link speed being determined based at least in part on the energy expended per unit of data transferred. In addition, an effective link speed based on the actual link speed and the current duty cycle of the system is reported to the operating system 410. Assuming that the component begins in an inactive state, data may be received for transmission and queued 415. The component is then put in an active mode for operation 420. Data packets are then sent and received at the selected link speed 425. Following the transmission, the link partner and any program filters are paused to allow the transmitting element to sleep between transmissions and thus to wait for more data for transmission at the more energy efficient link speed 430.

The system may then enter a low power inactive mode, putting the first component into an inactive (or sleep) mode 435. The inactive operation may include putting both the MAC and PHY elements (if applicable) into a sleep state. In an embodiment of the invention, the inactive mode is a deep sleep mode that minimizes the use of power when the element is not actively sending or receiving data. In an embodiment of the invention, the sleep mode maintains a transmission link to reduce the amount of time required to bring the system back to an active and ready status, but embodiments of the invention are not limited to such a sleep mode.

There may be a determination whether an adjustment in the data throughput is needed or desirable 440. If not, the system may return the transmission cycle, such as in receiving more data for transmission 415. If an adjustment in data throughput is needed, then an adjustment in the transmission duty cycle is made 445, which may increase or decrease the proportion of time that data is transmitted versus the proportion of time that the element is inactive in a sleep state.

Figure 5:
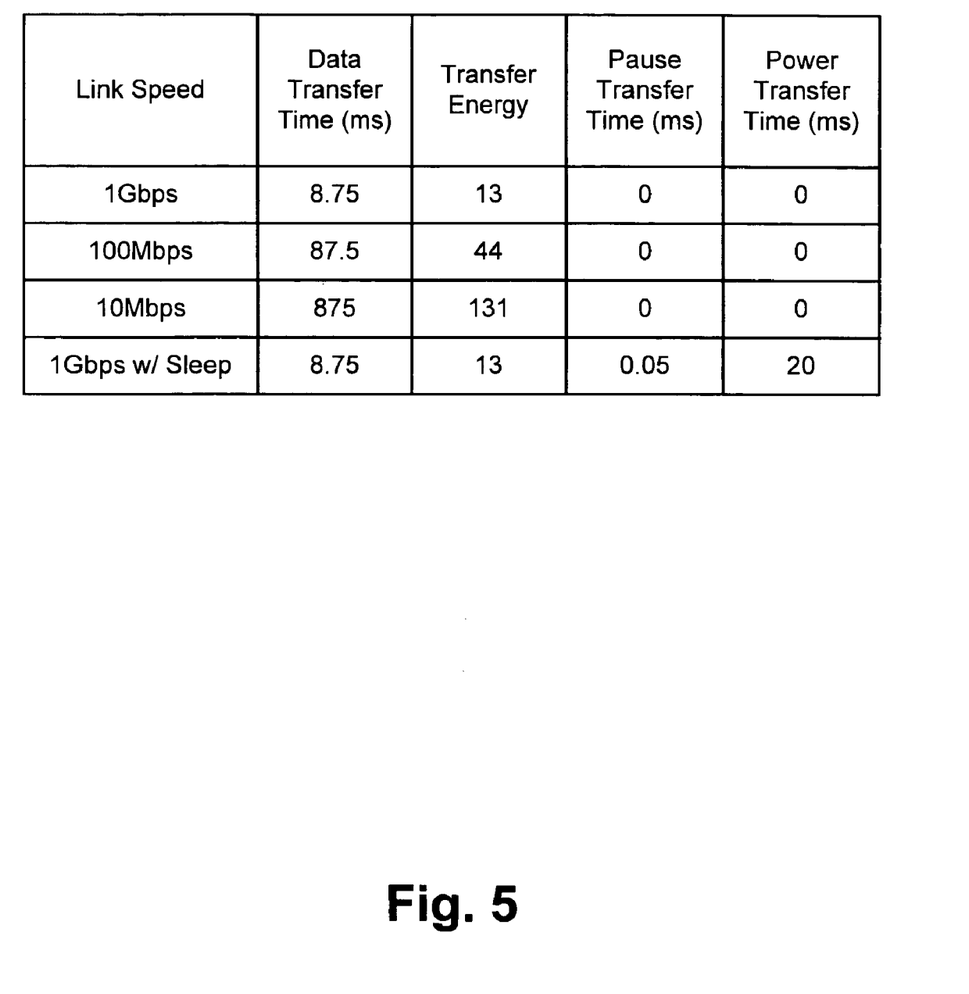
FIG. 5 is an illustration of energy costs of various link speeds for a device in an embodiment of the invention.

FIG. 5 is an illustration of energy costs of various link speeds for a device in an embodiment of the invention. The illustrated table provides examples for a particular device transferring data at three link speeds (10 Mbps, 100 Mbps, and 1 Gbps) in a conventional operation and at a link speed of 1 Gbps for a transmission including an inactive sleep mode under an embodiment of the invention. In this illustration, the total energy expended to transmit data may be composed of the Transfer Energy (the energy needed to transfer the data), plus idle time (the energy used in an idle state when not transferring data) and pause and transition energy (energy expended in connection with pausing transmission activities and transitioning to and from a sleep state). The time to transmit data is composed of the Data Transfer Time (the time expended in actually transferring the data), plus the Pause Transfer Time and Power Transition Time (time for pausing transmission activities and for transitioning to and from a low power inactive state).

As shown in FIG. 5, the data transfer rate may vary from 8.75 milliseconds at a link speed of 1 Gbps to 875 milliseconds at a link speed of 10 Mbps. For the 1 Gbps link speed, the transfer energy is only 13 energy units, but the idle time consumes additional energy units. In this example, the transfer energy for the data increases as the link speed is reduced, but the idle energy would be reduced with the reduction in link speed and thus the total energy may be reduced. Therefore, in a conventional system the link speed may be reduced to minimize the energy expended by the system.

However, under an embodiment of the invention, the total energy may be reduced by choosing the link speed that has the best efficiency in terms of energy per unit of data transferred. In FIG. 5, the most efficient transfer link speed is 1 Gbps, which expends only 13 units for the data transfer in this example. To this would be added the energy expended for pausing and for transition to a low power state and the energy expended in the low power state, which may be significantly less than the energy consumed by a device in an idle state. The total energy consumed thus may be reduced. The example provided reflects an exemplary device having certain characteristics and being transitioned to a very low power sleep state. Embodiments of the invention are not limited to elements having any particular characteristics, and may be used with a variety of different types of devices with varying power consumption properties. The choice of the most energy efficient link speed could vary depending on the energy expended for pause and transition operation and for idle operation because the most efficient link speed for transferring data may not be the most efficient when considering the total energy expenditure by the device.

Figure 6:
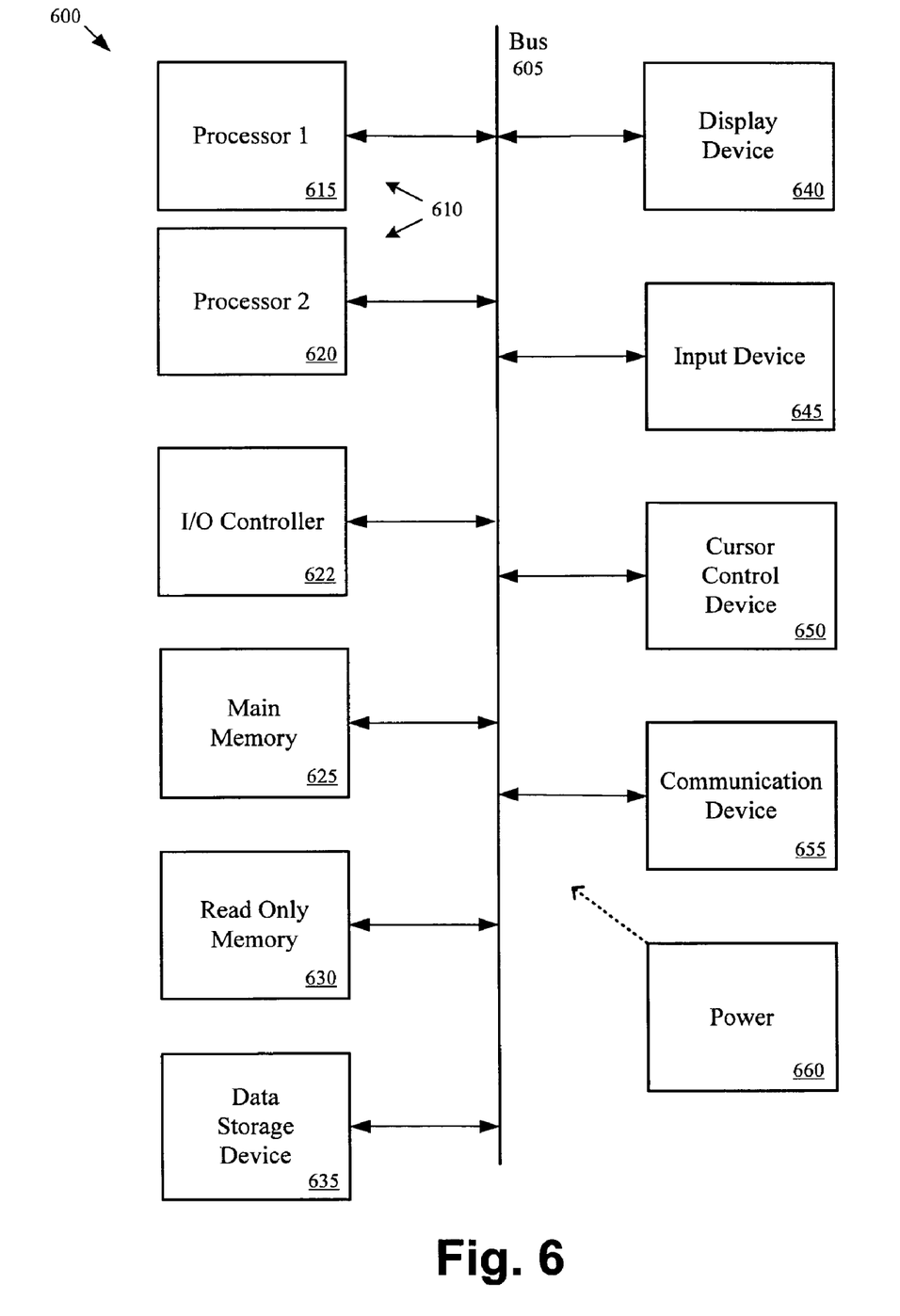
FIG. 6 is an illustration of an embodiment of a computer system.

FIG. 6 is an illustration of an embodiment of a computer system. Under an embodiment of the invention, a computer 600 comprises a bus 605 or other communication means for communicating information, and a processing means such as two or more processors 610 (shown as a first processor 615 and a second processor 620) coupled with the bus 605 for processing information. The processors 610 may comprise one or more physical processors and one or more logical processors. Further, each of the processors 610 may include multiple processor cores. The computer 600 is illustrated with a single bus 605 for simplicity, but the computer may have multiple different buses and the component connections to such buses may vary.

The computer may further include an I/O controller 622 to control input and output transactions. Under an embodiment of the invention, the I/O controller 622 of the computer 600 may transfer data at varying clock speeds. Under an embodiment of the invention, the computer will determine the most energy efficient available transmission speed in terms of Joules of energy per unit of data transferred. Under an embodiment of the invention, the I/O controller 622 will transfer data at such rate and enter a deep-sleep mode in time periods when not transferring data. Under an embodiment of the invention, the computer 600 will report an effective data transfer rate to an operating system of the computer 600 for the current duty cycle of data transfer and sleep periods, the duty cycle representing the relative time period for the data transfers and sleep operations.

The computer 600 further comprises a random access memory (RAM) or other dynamic storage device as a main memory 625 for storing information and instructions to be executed by the processors 610. Main memory 625 also may be used for storing temporary variables or other intermediate information during execution of instructions by the processors 610. The computer 600 also may comprise a read only memory (ROM) 630 and/or other static storage device for storing static information and instructions for the processors 610.

A data storage device 635 may also be coupled to the bus 605 of the computer 600 for storing information and instructions. The data storage device 635 may include a magnetic disk or optical disc and its corresponding drive, flash memory or other nonvolatile memory, or other memory device. Such elements may be combined together or may be separate components, and utilize parts of other elements of the computer 600. The data storage device 635 may include stored data regarding the energy efficient of the link speeds supported by the I/O controller 622.

The computer 600 may also be coupled via the bus 605 to a display device 640, such as a cathode ray tube (CRT) display, a liquid crystal display (LCD), a plasma display, or any other display technology, for displaying information to an end user. In some environments, the display device may be a touch-screen that is also utilized as at least a part of an input device. In some environments, display device 640 may be or may include an audio device, such as a speaker for providing audio information. An input device 645 may be coupled to the bus 605 for communicating information and/or command selections to the processors 610. In various implementations, input device 645 may be a keyboard, a keypad, a touch-screen and stylus, a voice-activated system, or other input device, or combinations of such devices. Another type of user input device that may be included is a cursor control device 650, such as a mouse, a trackball, or cursor direction keys for communicating direction information and command selections to the one or more processors 610 and for controlling cursor movement on the display device 640.

A communication device 655 may also be coupled to the bus 605. Depending upon the particular implementation, the communication device 655 may include a transceiver, a wireless modem, a network interface card, LAN (Local Area Network) on motherboard, or other interface device. In one embodiment, the communication device 655 may include a firewall to protect the computer 600 from improper access. The computer 600 may be linked to a network or to other devices using the communication device 655, which may include links to the Internet, a local area network, or another environment. The computer 600 may also comprise a power device or system 660, which may comprise a power supply, a battery, a solar cell, a fuel cell, or other system or device for providing or generating power. The power provided by the power device or system 660 may be distributed as required to elements of the computer 600. Under an embodiment of the invention, the drain of power from the power device 660 of system may be reduced by utilizing the most efficient link speed for the I/O controller 622 in terms of Joules of energy consumed from the power device or system 660 per unit of data transferred.

In the description above, for the purposes of explanation, numerous specific details are set forth in order to provide a thorough understanding of embodiments of the present invention. It will be apparent, however, to one skilled in the art that the embodiments of the present invention may be practiced without some of these specific details. In other instances, well-known structures and devices are shown in block diagram form.

Embodiments of the invention may include various processes. The processes of embodiments of the invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of embodiments of the invention may be provided as a computer program product, which may include a machine-readable medium having stored thereon instructions, which may be used to program a computer (or other electronic devices) to perform a process according to embodiments of the invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, embodiment of the invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but processes can be added to or deleted from any of the methods and information can be added or subtracted from any of the described messages without departing from the basic scope of embodiments of the invention. It will be apparent to those skilled in the art that many further modifications and adaptations can be made. The particular embodiments are not provided to limit embodiments of the invention but to illustrate such embodiments. The scope of embodiments of the invention is not to be determined by the specific examples provided above but only by the claims below.

It should also be appreciated that reference throughout this specification to "one embodiment" or "an embodiment" means that a particular feature may be included in the practice of embodiments of the invention. Similarly, it should be appreciated that in the foregoing description of exemplary embodiments of the invention, various features of embodiments of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. An apparatus comprising:
   a port for the transfer of data, the port having an active state in which the port may transmit or receive data and an inactive state in which the port does not transmit or receive data; and
   logic to control the transfer of data, the logic to place the port into the active state for a first time period for the transfer of data and to place the port into the inactive state for a second time period, the logic to prevent transfer of data during the inactive state, the apparatus having a plurality of available link speeds;
   wherein the logic is to choose a link speed from the plurality of link speeds based on the energy efficiency of the link speed, the energy efficiency of a link speed being based on an amount of energy required to transfer each unit of data and an amount of energy required for transition between the active state and the inactive state.

2. The apparatus of claim 1, wherein the apparatus has a duty cycle, the duty cycle comprising a first portion in which the apparatus is in the active state and a second portion in which the apparatus is in the inactive state.

3. The apparatus of claim 2, wherein the apparatus is to report an effective link speed to an operating system based on the chosen link speed.

4. The apparatus of claim 3, wherein the effective link speed is based at least in part upon the chosen link speed and a current duty cycle of the apparatus.

5. The apparatus of claim 1, further comprising a data storage to contain data regarding the energy efficiency of each of the plurality of link speeds.

6. The apparatus of claim 1, wherein the apparatus comprises an I/O (input/output) controller.

7. The apparatus of claim 1, wherein the inactive state retains a link to the link partner.

8. A method comprising:
   selecting a link speed from a plurality of link speeds for transfer of data from a first component to a second component, wherein the selection of the link speed is based at least in part on an energy efficiency of the link speed for transmitting data, the energy efficiency of a link speed being based on an amount of energy required to transfer a certain quantity of data and an amount of energy required for transition between the active state and the inactive state;
   placing the first component in the active state;
   transmitting data from the first component to the second component during the active state at the chosen link speed; and
   transitioning the first component from the active state to an inactive state; and
   preventing data transmission during the inactive state.

9. The method of claim 8, further comprising reporting an effective link speed to an operating system, wherein the effective link speed reflects an estimated data throughput.

10. The method of claim 8, further comprising transitioning from the inactive state to the active state when ready to transmit additional data.

11. The method of claim 8, further comprising storing data packets received for transmission during the inactive state.

12. The method of claim 11, wherein transmitting data during an active state comprises sending the stored data packets from the preceding inactive state.

13. The method of claim 8, further comprising modifying the relationship between a time period for the active state and a time period for the inactive state.

14. The method of claim 8, wherein preventing data transmission during the inactive state comprising sending a pause request to the second component to prevent receipt of data from the second component during the inactive state.

15. A computer system comprising:
   a bus for transfer of data; and an I/O (input/output) controller coupled to the bus, the I/O controller having a plurality of available transmission speeds, the I/O controller including:
- a port for transmission and receipt of data, the port having a first mode in which data may be transferred and a second mode when the data cannot be transferred, and
- logic for the control of data transmission by the I/O controller, the logic to transition the I/O controller between the first mode and the second mode wherein the logic is to choose a transmission speed from the plurality of transmission speeds based on the energy efficiency of the transmission speed, the energy efficiency of a transmission speed being based on an amount of energy required to transfer each unit of data and an amount of energy required for transition between the first mode and the second mode.

16. The computer system of claim 15, further comprising an operating system, the I/O controller to notify the operating system regarding an expected data throughput.

17. The computer system of claim 16, where the expected data throughput is based on at least the chosen transmission speed and the relative time periods for the first mode and the second mode.

18. The computer system of claim 15, wherein the logic is to prevent data transmission with a link partner during the second mode.

19. The computer system of claim 15, further comprising a memory coupled to the bus, the memory to hold information regarding the energy efficiency of each of the transmission speeds.

20. The computer system of claim 15, wherein the computer system adjusts relative time periods for the first mode and the second mode based on current conditions.

* * * * *